United States Patent [19]

Augustine

[11] 4,334,566
[45] Jun. 15, 1982

[54] TIRE TRACTION DEVICE

[76] Inventor: Leo Augustine, 235 The Donway West, Apt. 3, Don Mills, Ontario, Canada, M3B 2V7

[21] Appl. No.: 184,061

[22] Filed: Sep. 4, 1980

[30] Foreign Application Priority Data

May 4, 1977 [CA] Canada .................................. 277678

[51] Int. Cl.³ .............................................. B60C 27/00
[52] U.S. Cl. .................................... 152/208; 152/221; 428/135
[58] Field of Search ........... 152/208, 221, 222, 225 R, 152/225 C, 228, 185.1, 188; 238/14; 301/41 R, 42, 44 R, 44 T; 180/16; 428/134, 135

[56] References Cited

U.S. PATENT DOCUMENTS

| | | | |
|---|---|---|---|
| 1,293,528 | 2/1919 | Palmer | 152/208 X |
| 2,682,907 | 7/1954 | Krueger | 152/208 X |
| 2,952,290 | 9/1960 | Gaspardo | 152/208 |
| 3,043,356 | 7/1962 | Mayhercy | 152/208 |
| 3,400,744 | 9/1968 | Muller | 152/208 |
| 3,675,701 | 7/1972 | Garrison | 152/225 R |

Primary Examiner—John E. Kittle
Assistant Examiner—Thomas Bokan
Attorney, Agent, or Firm—Remy J. VanOphem

[57] ABSTRACT

A tire traction device includes at least two continuous circumferentially extending tread groove bead members adapted to nest within respective circumferentially extending tread grooves of selected vehicle tires. A plurality of circumferentially spaced transverse traction elements are integral with and connect the tread groove bead members. The traction elements are configured and dimensioned to overlie the tread of the tire and to thereby improve the traction thereof. Preferably a circumferentially extending traction element is provided intermediate the tread groove bead members and the transverse traction elements are arranged in circumferentially spaced pairs connecting the tread groove members and the circumferential traction element.

1 Claim, 4 Drawing Figures

TIRE TRACTION DEVICE

BACKGROUND OF THE INVENTION

The present invention relates to tire traction devices and more particularly to such a device adapted to be removably attached to a vehicle tire by members which repose within the circumferentially extending tread grooves of the tire.

Tire traction devices for improving the traction of vehicle tires on wet and/or snow or ice covered roads have of course been known heretofore. Conventionally such devices have taken the form of chains. As is commonly known, the mounting of such chains on the tires of a vehicle is time consuming and frequently requires the attendance of more than one person. In use the chains tend to be noisy and often strike the fenders or tail pipe of the vehicle so as to cause damage to such parts. The anti-skid chains employed heretofore were also often deficient in respect to their capacity to inhibit lateral or side skidding. Further, the chains generally resulted in excessive wear on the tires including the side walls of the tires.

In an attempt to obviate certain of the disadvantages of chains a tire encircling track was developed and U.S. Pat. No. 3,675,701 issued July 11, 1972 to George E. Garrison on such a device. The Garrison device is in the nature of an overtire and includes a pair of flexible molded rims and traction bars connected transversely therebetween. The rims and bars are adapted to overlie the tread of a tire. Connector means must be employed to secure the ends of the rims once the device is positioned upon the tire. The device is rather complex and, while avoiding certain of the disadvantages of chains, is relatively expensive and still requires a mounting procedure similar to the conventional chain anti-skid device. U.S. Pat. Nos. 2,952,290 and 3,043,356 issued Sept. 13, 1960 and July 10, 1962 respectively to M. S. Gaspardo and to K. W. Mayhercy disclose tire traction devices which include elements adapted for disposition within the circumferentially extending tread grooves; however such devices also must be mounted on the tire in the manner of a chain and require locking elements to connect the ends of the device. The constructions of Gaspardo and Mayhercy are also both rather complex and relatively expensive.

SUMMARY OF THE INVENTION

It is an object of the invention to provide a tire traction device of simple construction which can be mass-produced for marketing at relatively low cost.

It is another object of the invention to provide a tire traction device which can easily be mounted upon and removed from a vehicle tire without the need for any tools or special equipment.

It is still another object of the invention to provide a tire traction device which is not unduly noisy in use and which will not strike the adjacent parts of the vehicle to cause damage thereto.

It is yet another object of the invention to provide a tire traction device which affords resistance against lateral or side skidding.

Other objects and advantages of the invention will become readily apparent from the following description of the invention.

According to the present invention there is provided a tire traction device comprising at least two continuous circumferentially extending tread groove bead members adapted to nest within corresponding circumferential tread grooves of a vehicle tire; a plurality of circumferentially spaced transverse traction elements integrally connected to the bead members; the traction elements being configured and dimensioned to overlie the tread of the tire and to project outwardly therefrom.

BRIEF DESCRIPTION OF THE DRAWINGS

In order that the invention may be more fully comprehended it will now be described, by way of example, with reference to the accompanying drawings, in which.

DETAILED DESCRIPTION OF THE PREFERRED EMBODIMENT

Figure 1:
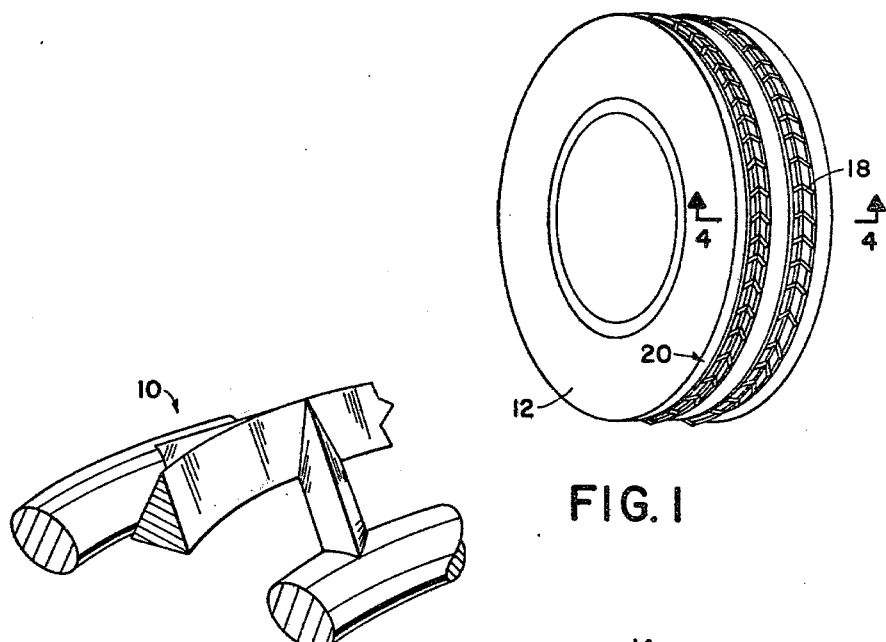
FIG. 1 is a perspective view of a vehicle tire having an anti-skid or traction device embodying the features of the invention mounted thereon.
Figure 2:
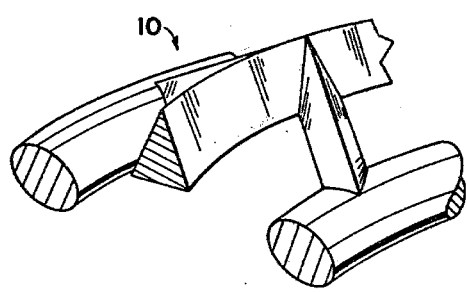
FIG. 2 is a partial perspective view of the tire traction device of FIG. 1 removed from the tire.

Referring to the drawings, there is shown generally as indicated by reference numeral 10, a tire traction device which is made of a synthetic plastics material. Nylon is a preferred material since it is easily formed into the desired configuration, such as by molding or extrusion, is relatively indestructible and possesses some resiliency which latter characteristic facilitates mounting of the device on a vehicle tire 12.

The traction device comprises at least two continuous circumferentially extending tread groove bead members 14. Such bead members are desirably given a round cross-sectional configuration; however, the particular shape is not critical and a square configuration may be employed with similar effectiveness. The beads are dimensioned to fit within the circumferential tread grooves 16 of a vehicle tire. Since the beads have a predetermined circumference they are designed to be mounted upon a tire having a specific size. Further, although the device shown in the drawings is provided with two beads it will be understood that the invention also contemplates the formation of the device with three or even four of such beads if there are tires available with tread patterns presenting a sufficient number of tread grooves to accommodate the beads. However, with tires having four tread grooves it is possible to utilize a pair of traction devices each having a pair of bead members.

The device also includes a plurality of circumferentially spaced transverse traction elements 18. Such elements are formed integrally with bead members 14 and are thus connected therewith. The transverse traction elements are adapted to overlie the tread 20 of the tire to afford the intended enhancement of the tire traction. To afford maximum gripping of the roadway by such traction elements they are given a triangular cross-sectional configuration. Other non-planar surfaces may also be used; however, such other configurations should be selected as will protrude outwardly from the base of the tire tread.

Figure 3:
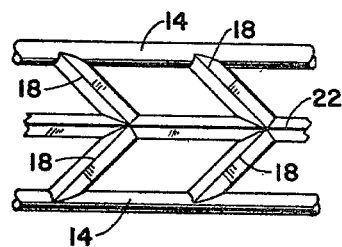
FIG. 3 is a top plan view of a segment of the tire traction device shown in FIG. 2.
Figure 4:
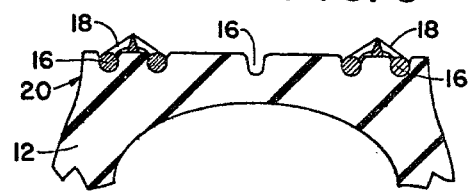
FIG. 4 is a cross-sectional view of the tire traction device of the invention mounted on the tire illustrated in FIG. 1 taken along line 4—4 thereof.

In its preferred form the traction device includes a circumferentially extending traction element 22 positioned between the tread groove bead members 14. This circumferential traction element may be given the same cross-sectional configuration as that of the transverse traction elements. As can be seen most clearly from FIG. 3, one end of each of the transverse traction elements is connected to one of the bead members and the other end is connected to the circumferential traction element. The transverse traction elements are preferably arranged between the bead members in a herringbone pattern.

It will be appreciated that the device is constructed in various sizes so as to be mounted upon tires having a predetermined range of sizes. In order to mount the device on a tire the tire is deflated and the device expanded to fit over the tire. Once the tire is surmounted by the device the bead members are positioned within the corresponding tread grooves and the tire is inflated to locate the bead members securely therewithin for use. The resiliency of the material from which the device is formed serves to facilitate expansion of the device over the time during the mounting procedure.

It will be recognized that since the entire device may be formed in a single molding step or may be made by extruding the circumferential beads and traction element, and by fusing such components to the transverse traction elements, mass production techniques may be utilized to advantage. This leads to a reduction in fabrication costs and enables the marketing of the device at generally lower prices than previously available anti-skid devices.

The embodiments of the invention in which an exclusive property or privilege is claimed are defined as follows:

1. A tire traction device comprising at least two continuous circumferentially extending tread groove bead members adapted to nest within corresponding circumferential tread grooves of a vehicle tire; a plurality of circumferentially spaced transverse traction elements of triangular cross-section integrally connected to said bead members; said traction elements being configured and dimensioned to overlie the tread of the tire and to project outwardly therefrom, and a continuous circumferentially extending traction element of triangular cross-section positioned between said bead members and connected thereto by said transverse traction elements such that said traction elements are disposed with an apex of said triangle directed outwardly, circumferentially spaced pairs of said transverse traction elements being connected between said bead members and said continuous circumferentially extending traction element in a V-shape both laterally and vertically.

* * * * *

UNITED STATES PATENT AND TRADEMARK OFFICE
CERTIFICATE OF CORRECTION

PATENT NO. : 4,334,566

DATED : June 15, 1982

INVENTOR(S) : Leo Augustine

It is certified that error appears in the above—identified patent and that said Letters Patent is hereby corrected as shown below:

Column 3, Line 20, Delete "time" and insert --- tire ---

Signed and Sealed this

Eleventh Day of January 1983

[SEAL]

Attest:

GERALD J. MOSSINGHOFF

Attesting Officer     Commissioner of Patents and Trademarks